United States Patent [19]

Mondragon et al.

[11] Patent Number: 4,943,148
[45] Date of Patent: Jul. 24, 1990

[54] SILICON WAFER HOLDER

[75] Inventors: Carl W. Mondragon; David A. Sperry, both of Boise, Id.

[73] Assignee: Micron Technology, Inc., Boise, Id.

[21] Appl. No.: 260,468

[22] Filed: Oct. 20, 1988

[51] Int. Cl.⁵ ............................................. G02B 21/34
[52] U.S. Cl. ...................................... 350/529; 269/97; 356/244; 414/786
[58] Field of Search ............... 350/529, 530, 531, 532, 350/534, 533, 536; 414/749, 750, 751, 753, 786; 269/22, 43, 97, 152

[56] References Cited

U.S. PATENT DOCUMENTS

| | | | |
|---|---|---|---|
| 2,333,114 | 11/1943 | Meyer | 81/33 |
| 2,471,103 | 5/1949 | Franks et al. | 81/6 |
| 3,088,729 | 5/1983 | Marcus | 269/97 |
| 4,242,038 | 12/1980 | Santini et al. | 414/786 |
| 4,252,303 | 2/1981 | Shimai | 269/43 |
| 4,255,077 | 3/1981 | Smith | 414/786 |
| 4,508,326 | 2/1985 | Andre | 269/22 |
| 4,582,191 | 4/1986 | Weigand | 350/532 |
| 4,711,438 | 12/1987 | Guarino | 269/152 |
| 4,789,294 | 12/1988 | Sato et al. | 414/749 |
| 4,818,169 | 4/1989 | Schram et al. | 350/531 |

FOREIGN PATENT DOCUMENTS 57-96527  6/1982  Japan ........................ 30/58

Primary Examiner—Bruce Y. Arnold
Assistant Examiner—Martin Lerner
Attorney, Agent, or Firm—Stanley N. Protigal; Angus C. Fox; Jon P. Busack

[57] ABSTRACT

A holder for positioning silicon wafers on a microscope stage for uniform and repeatable viewing under the microscope. The holder comprises a circumferential rib having an arc of from about 60°–180° diametrically opposed to a radially aligned slit within which a bracket member is positioned. Actuation of the bracket member pushes against a major flat on the silicon wafer, causing the leading edge of the wafer to bear against the abutment. The holder, or platen, is provided with calibration standards on a circumferential edge portion, and is also provided with at least one access port permitting access to the underside of the wafer with vacuum wands.

15 Claims, 2 Drawing Sheets

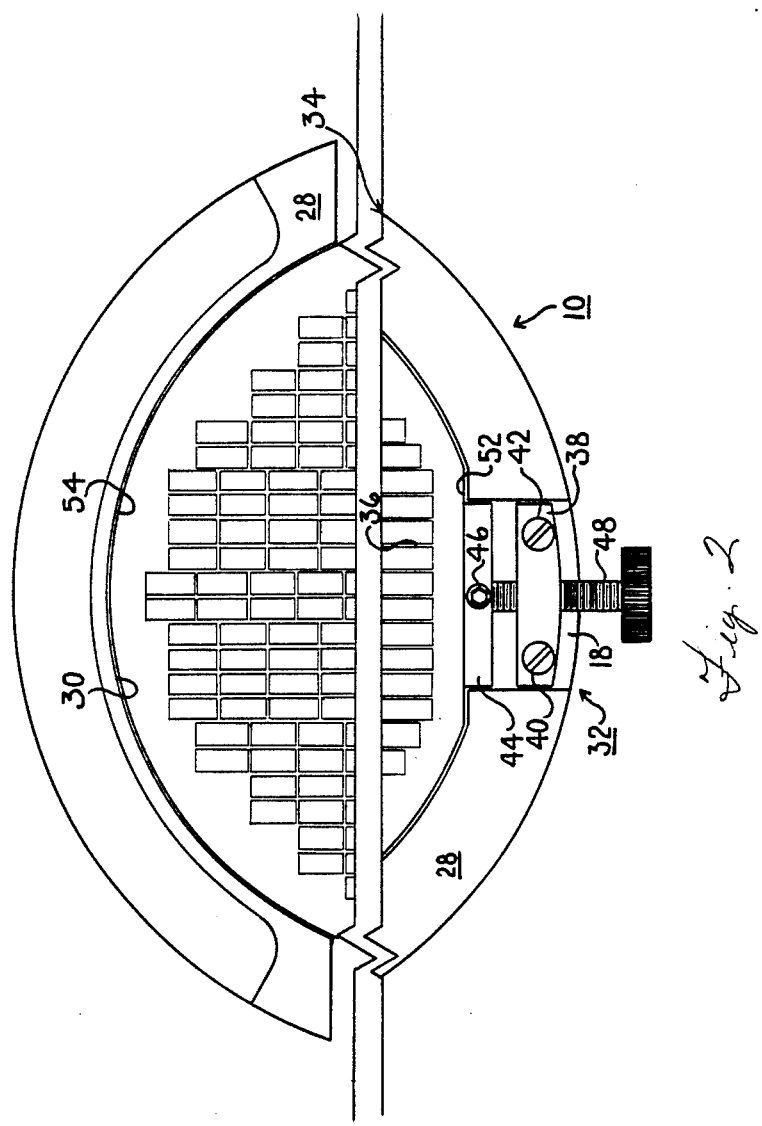

SILICON WAFER HOLDER

BACKGROUND OF THE INVENTION

Removable platens for holding objects for observation under microscopes are well known to those of skill in the art. For instance, platens holding a plurality of glass slides which interfit with fixed microscope stages are available to hold a plurality of such slides. More specifically, platens for holding silicon wafers having a plurality of semiconductor chips imprinted thereon for viewing under scanning electron microscopes (SEM) are also known. For example, such platens have a three-point clip system to hold the wafer to the platen for insertion onto the SEM stage. A spring-loaded retaining means forces the wafer against a pair of fingers spaced apart from one another to securely hold the wafer in place.

While the existing wafer holder (such as the Model 1830T wafer holder manufactured by Amray Inc. of Bedford, Mass. functions adequately to hold the wafer securely in place, there are a number of disadvantages associated with currently available products. Firstly, the three-point positioning system provides relatively large variability in the positioning of the wafer on the wafer holder, or platen. Because the spring-loaded retaining means is quite small, and because the retaining means forces the wafer against a pair of spaced-apart fingers, there is very little surface area of contact between the wafer and the wafer holder. Secondly, the particular construction of the presently available wafer holders results in the operator's fingers being frequently in contact with the surface of the wafer, thereby possibly damaging or inducing contamination onto the semiconductor chips imprinted thereon. Lastly, calibration standards must be inserted into the microscope stage for equilibration of the microscope, and then removed when the wafer and wafer holder are inserted.

Various other mechanisms have been proposed for securely holding arcuate objects such as silicon wafers. For instance, U.S. Pat. No. 2,333,114, Meyer, discloses a vise for holding small articles, such as movements of time pieces. Similarly, U.S. Pat. No. 2,471,103, Franks et al, discloses a pair of stationary pins 14, 15 and a pair of movable pins 18. 19 which are adapted to securely hold a round work piece, such as watch movements. U.S. Pat. No. 4,711,438, Guarino, discloses a mask holding device capable of accepting masks of different size. The holder includes a clamp assembly having a spring-loaded lower clamping arm to hold the mask securely in place. A quick-acting vise is disclosed in U.S. Pat. No. 3,088,729 Marcus, wherein a pair of jaws are slidably retained upon a track for holding a work piece therebetween. While not deemed by Applicants to be especially relevant, the following patents disclose devices relating to this subject matter: U.S. Pat. No. 4,508,326, Andre, U.S. Pat. No. 4,252,303, Shimai, and Japanese Pat. No. 57-96527.

Current manufacturing protocol in the electronics industry requires that silicon wafers having from 200–600 semiconductor chips imprinted on each five-inch diameter wafer are inspected at from about 5–10 sites per wafer by a SEM. The SEM stage is controlled by computer to locate the identical site on each successive wafer platen. As many as 30 sites per wafer may be inspected for engineering quality control. If the location of the wafer retained by the platen is not virtually identical from wafer to wafer, the preset microscopic scans will not identify the same location, thereby vitiating the viability of the quality control procedures. Applicant has determined that with currently available wafer holders, the variability inherent in such holders results in as much as about +/−600 micron accuracy.

Calibration standards are required for high resolution in every SEM. Typically in the observation of silicon wafers for quality control, a dummy wafer and placed bearing the calibration standards is inserted in a wafer holder onto the SEM stage, and the SEM is then calibrated. Any variation in the insertion of the holder, the wafer, wafer thickness, etc., will induce calibration errors into the system.

Finally, the particular construction of the currently available wafer holder requires that a pair of metal or plastic tweezers be used to insert the wafer onto and remove from the wafer holder. Adequate access ports are not provided to enable the use of a vacuum wand—the desired method of handling such wafers. Therefore, a wafer holder or platen which reduces the location variability, reduces the likelihood of operator-induced contamination, and provides a convenient calibration method, as needed.

SUMMARY OF THE INVENTION

The present invention comprises a holder or platen for a generally circular silicon wafer having a large number of semiconductor chips imprinted thereon. The holder is affixed to a microscope stage so that a representative sample of the chips on the wafer may be viewed for quality control purposes. It is imperative that the wafer be positioned in the holder within very close tolerances (on the order of +/−150 microns, or less) so that when the stage is moved through a series of computer-controlled locations, identical sites on successive wafers are viewed.

The platen is a generally circular apparatus having a planar portion milled from the center thereof which is slightly larger than the size of the silicon wafer to be held therein. A ridge extending in an arc of from 60°–180° is therefore provided against which the leading edge of the wafer is abutted. Diametrically opposed to the ridge is a radially aligned slot within which is retained a bracket member. The bracket member comprises a stationary member affixed to the platen with a threaded member threaded therethrough. The radially inward end of the threaded member is provided with a clamp which bears against the major flat of the wafer so as to cause the leading edge of the wafer to abut against the ridge when the threaded member is closed.

The platen is provided with a circumferential edge portion which is adapted to receive calibration standards, such as for magnification, resolution, etc., so as to negate the need to enter a calibration platen prior to observation of a wafer.

The platen is likewise provided with enlarged access ports providing access to vacuum wands, eliminating the need for use of metal tweezers which may damage the wafer.

The apparatus of the present invention solves the three primary problems currently experienced by users of prior art apparatus: uniform positioning of the silicon wafer within the platen assures accurate and repeatable microscopic views; calibration standards are built into the platen, reducing the time and variability incident of such calibration; and contamination of the wafer is reduced because of the easy placement and removal of the wafer in the platen.

BRIEF DESCRIPTION OF THE DRAWINGS

FIG. 2 is a front elevation of the apparatus of the present invention in use.

DETAILED DESCRIPTION OF THE INVENTION

Figure 1:
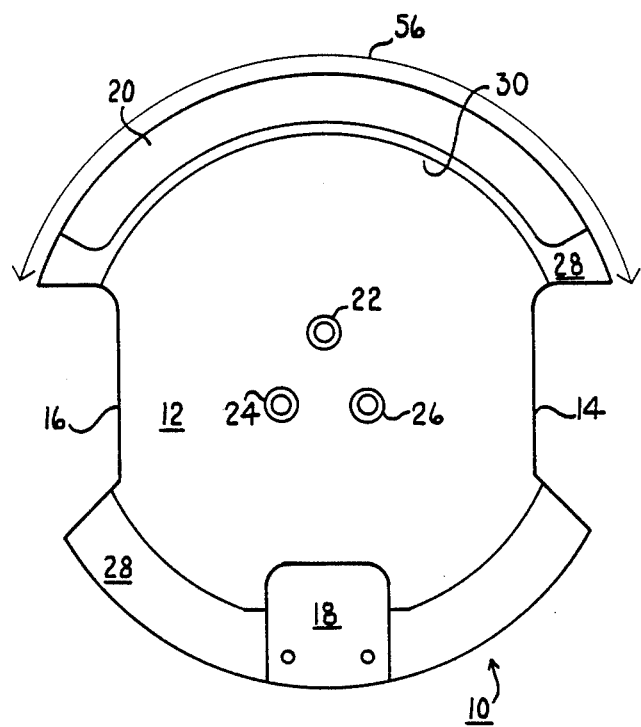
FIG. 1 is a front elevation of the platen of the present invention.

The apparatus of the present invention is primarily useful in the holding of silicon wafers having a plurality of semiconductor chips imprinted thereon. However, it is to be understood that this apparatus has applicability in the microscopic-observation of any circular, planar object wherein precision is required in the placement of the object in the microscope field of view. For instance, when making a random count of the number of discrete objects in an extremely large population (such as the number of affected red-blood cells in a blood sample) the apparatus of the present invention can be useful. However, as the device was developed for a specific purpose, the following description will be directed to the environment of silicon wafers.

As is well known to those familiar with the art, silicon wafers are relatively thin (610–640 mils.) and have varying diameters, ranging from 4 to 8 inches. Typically, such wafers are manufactured with diameters of either five or six inches. Such wafers are provided with a major flat and at least one minor flat. A five inch wafer may contain, for example, from 220 to 600 semiconductor chips per wafer.

Quality control procedures require that each wafer be analyzed at an appropriate number of sites so that representative chips may be viewed to insure proper quality. Such analysis occurs under a scanning electron microscope, with the sites selected by a computer-controlled stage onto which the wafer is affixed. The wafer is secured within a wafer holder, or platen, with the platen then secured to the stage. In order to assure that identical sites are reviewed on successive wafers, the wafer must occupy the same position on the platen.

Referring specifically to the drawings, FIG. 1 illustrates a platen, generally designated 10 having a circular planar surface 12, a pair of access ports 14, 16, a radially aligned slot 18 and a circumferential edge portion 20. The diameter of the platen 10 is greater than the diameter of the silicon wafer to be viewed: for example a platen of FIG. 1 may be approximately 6.25 inches in diameter when designed to hold a 5-inch diameter wafer. The milled surface 12 of the platen is provided with a plurality of apertures 22, 24, 26 which may be utilized to secure the platen to the microscope stage, as by bolts (not shown). The surface 12 is preferably milled such that it is a "pocket" or depression lower than the level of the circumferential rib 28, with an inner surface 30 having a uniform radius from the center of planar surface 12. The slot 18 is milled to be substantially lower than the surface 12.

FIG. 2 illustrates the device of the present invention in partial view with a bracket member, generally designated 32 holding a silicon wafer, generally designated 34, to the platen 10. As illustrated, the wafer 34 comprises a large number of semiconductor chips 36. The bracket member 32 comprises a stationary bracket portion 38 secured to the rib 28 by a pair of screws 40, 42. A movable clamp means 44 is affixed by means of screw 46 to a threaded member 48. A leading edge 50 of member 44 abuts against the major flats 52 of wafer 34. By screwing the member 48 inwardly, the clamp 44 is made to abut against the major flat 52, thereby forcing the diametrically opposed leading edge 54 of wafer 34 against the face 30 of rib 28. Therefore, the wafer 34 "nests" within the milled-out surface 12 of the platen 10. The compressive force generated by bracket member 32 is sufficient to retain the wafer securely within the platen 10.

The clamp 44 affixed to threaded member 48 slides within the radially aligned slot 18 so as to be aligned with major flat 52. The radius of curvature of arc 56 defined by the inner surface 30 of rib 28 is equivalent to the circumferential arc of the periphery of a silicon wafer. Therefore, rather than aligning the wafer, against a pair of posts, the clamp 44 pushes the leading edge 54 of the wafer against the face 30, thereby "self-aligning" the wafer in the same position each time. The arc 56 is preferably from about 60° to about 180°, and most preferably from 120° to about 140°. It is believed that the greater the arc 56, the more uniform will be the alignment of the wafer within platen 10.

The access ports 14, 16 provide a unique means to load and unload the wafer within the platen. Whereas prior art spring-loaded platens required that retaining means be manually withdrawn prior to inserted or removing the wafer, the present invention permits the wafer to be removed by a vacuum wand. The wand (not shown) is attached to the underside of the wafer approximately 90° around the periphery, as measured from the major flat. The size of the access ports 14, 16 permit the vacuum wand to be applied to the wafer without fear of scratching or other contamination.

A unique feature of the apparatus of the present invention is the provision of a circumferential edge portion 20 which is adapted to receive calibration standards, necessary in the calibration of scanning electron microscopes as well as many other microscopes. Prior to the advent of the present invention, calibration standards were inserted into the SEM to calibrate the microscope, and thereafter withdrawn for insertion of the object to be viewed. NBS standards 56, such as for magnification, resolution, critical dimension width and pitch, stigmation, etc., may be mounted to the platen at the circumferential edge portion 20, thereby providing a one-step calibration-viewing process.

When the platen is securely affixed to the microscope stage, the computer-controlled movable stage is moved to various locations for viewing specific sites on specific semiconductor chips. It is critical that the same location be viewed from wafer to wafer in order to track manufacturing and engineering quality control. The three-point locating system of the prior art is accurate to about +/−600 microns. Such high degree of inaccuracy is unacceptable since an operator is not able to view precisely the same location from wafer to wafer. The apparatus of the present invention is accurate to within about +/−50 microns, well within the field of view utilized to conduct quality control procedures on the semiconductor chips.

While a preferred embodiment of the invention has been disclosed, various modes of carrying out the principles disclosed herein are contemplated as being within the scope of the following claims. Therefore, it is understood that the scope of the invention is not be limited except as otherwise set forth in the claims.

We claim:

1. A holder for microscopically observing a generally circular, planar wafer, comprising:
   (a) a substantially circular platen having a planar surface adapted to receive said wafer and having a diameter greater than a diameter of said wafer;
   (b) a circumferential rib extending around at least a portion of a periphery of said platen, said rib being raised above the planar surface of said platen;
   (c) a radially aligned slot provided in the planar surface of said platen and diametrically opposed to said circumferential rib; and
   (d) a bracket abutting against a major flat of the wafer and sliding radially within the radially aligned slot, such that a circumferential arc of the wafer is in substantially uniform contact with the circumferential rib.

2. The holder as recited in claim 1, wherein when said wafer is securely affixed in the holder, the wafer is uniformly centered on said platen to a tolerance of less than about 150 microns.

3. The holder as recited in claim 1, wherein the circumferential rib is provided in an arc of from about 60° to about 180°.

4. The holder as recited in claim 3, wherein the circumferential rib is provided in an arc of from about 120° to about 140°.

5. The holder as recited in claim 1, wherein the platen is provided with a circumferential portion imprinted with standards for microscopic calibration.

6. A holder for microscopically observing a generally circular planar wafer having a plurality of semiconductor chips imprinted thereon, comprising:
   (a) a substantially circular platen having a planar surface adapted to receive said wafer and having a diameter greater than a diameter of said wafer and a circumferential rib extending around at least a portion of a periphery of said platen, said rib being raised above the planar surface of said platen;
   (b) a radially aligned slot diametrically opposed to said circumferential rib provided in the planar surface of said platen and a bracket adapted to slide radially within said slot; and
   (c) said wafer having a major flat such that the bracket abuts against the major flat and forces a circumferential rib when the bracket slides radially within the radially aligned slot.

7. The holder as recited in claim 6, wherein said wafer comprises a silicon wafer having a major flat, the circumferential arc of said wafer being diametrically opposed to said major flat and being equivalent to the arc of the circumferential rib of said platen.

8. The holder as recited in claim 6, wherein the circumferential rib is provided in an arc of from about 60° to about 180°.

9. The holder as recited in claim 8, wherein the circumferential abutment is provided in an arc of from about 120° to about 140°.

10. The holder as recited in claim 6, wherein the platen comprises a circumferential edge portion having calibration standards imprinted thereon for microscopic calibration.

11. A holder for microscopically observing a generally circular planar wafer having a plurality of semiconductor chips imprinted thereon, comprising:
    (a) a substantially circular platen having a planar surface adapted to receive said wafer and having a radius greater than the radius of said wafer and a circumferential rib extending around the periphery of said platen in an arc of from about 60° to about 180°, said rib being raised above the planar surface of said platen;
    (b) a radially aligned slot provided in the planar surface of said platen and a bracket adapted to slide radially within said slot; and
    (c) said wafer having a major flat such that the bracket abuts against the major flat and forces the circumferential arc of the wafer into contact with the circumferential rib when the bracket slides radially within the radially aligned slot.

12. The holder as recited in claim 11, wherein the circumferential abutment is provided in an arc of from 120° to about 140°.

13. The holder as recited in claim 11, wherein when said wafer is securely affixed in the holder, the wafer is uniformly centered on said platen to a tolerance of less than about 150 microns.

14. The holder as recited in claim 11, wherein the platen comprises a circumferential edge portion provided with calibration standards imprinted thereon for microscopic calibration.

15. The holder as recited in claim 11, wherein the platen includes at least one access port providing access to place the wafer on and remove the wafer from the platen.

* * * * *